L. M. YAGGY.
DRIVING MECHANISM FOR TRACTORS.
APPLICATION FILED AUG. 11, 1917.
1,273,711.
Patented July 23, 1918.
2 SHEETS—SHEET 1.
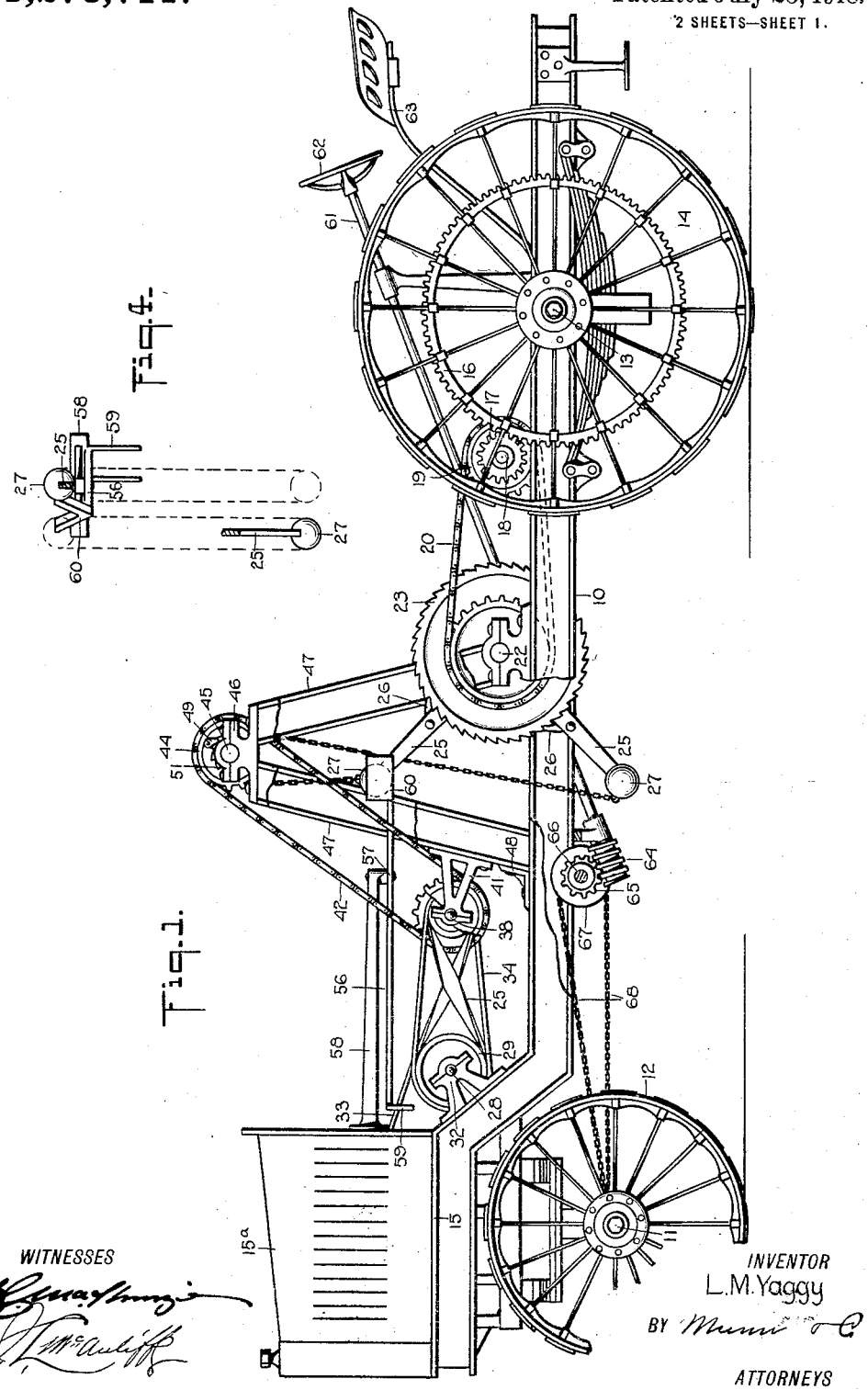
WITNESSES
INVENTOR
L.M.Yaggy
BY
ATTORNEYS

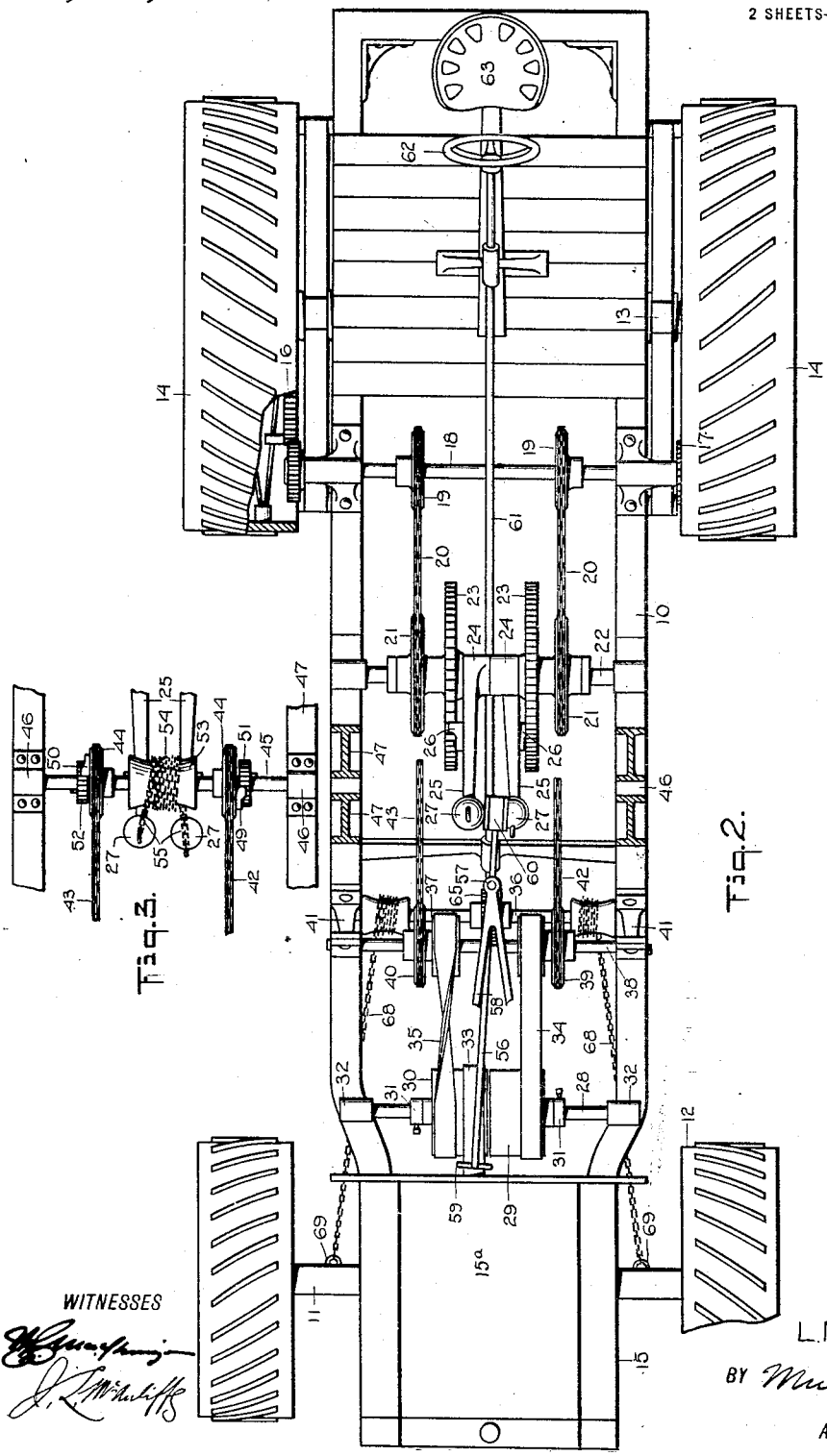

UNITED STATES PATENT OFFICE.

LUTHER MARTIN YAGGY, OF BOWMAN, NORTH DAKOTA.

DRIVING MECHANISM FOR TRACTORS.

1,273,711.  Specification of Letters Patent.  Patented July 23, 1918.

Application filed August 11, 1917. Serial No. 185,751.

*To all whom it may concern:*

Be it known that I, LUTHER M. YAGGY, a citizen of the United States, and a resident of Bowman, in the county of Bowman and State of North Dakota, have invented a new and Improved Driving Mechanism for Tractors, of which the following is a full, clear, and exact description.

My invention is applicable to tractors generally and more particularly relates to a tractor in which the rear axle is driven from a motor mounted on the tractor at the front.

The general object of my invention is to provide a novel drive means.

A more specific object of the invention is to provide a drive means in which ratchet mechanism in driving connection with the driven axle is actuated from the motor by driving means including a system of belts and belt-shifting means controlled by the movement of ratchet levers.

The nature of the invention will more clearly appear from the specific description following.

Reference is to be had to the accompanying drawings forming a part of this specification in which similar reference characters indicate corresponding parts in all the views, it being understood that the drawings are merely illustrative of one example of the invention.

Figure 1 is a side elevation of a tractor embodying my invention, parts being broken away and others being shown in section;

Fig. 2 is a plan view, parts being broken away and others in section;

Fig. 3 is a fragmentary plan view of the parts omitted from Fig. 2;

Fig. 4 is a rear elevation of the belt-shifting device, the rigid levers being shown in section and their throw or vertical paths of movement being indicated by dotted lines.

The numeral 10 indicates a tractor frame which may be of any approved design; 11, the front axle having wheels 12; and 13, the rear driven axle having wheels 14. A suitable motor (not shown) is mounted on the frame 10 and in practice this preferably will be an internal combustion engine supported on the front platform 15, the character 15ª indicating the motor hood.

The rear wheels 14 have rigid gear wheels 16 thereon meshing with which are gear pinions 17 on a transverse shaft 18. On the shaft 18 are fixed sprocket wheels 19 over which chain belts 20 run, said belts running also about chain wheels 21 fixed on a transverse shaft 22. Fixed on the shaft 22 also, are ratchet wheels 23. Loose on the shaft 22 between the ratchet wheels 23 are the hubs 24 of ratchet levers 25 carrying pawls 26. The outer ends of the levers 25 carry weights 27, and said levers are actuated from the motor on the platform 15 by the means next described.

Adjacent to the motor platform 15 is a transverse shaft 28 loose on which are broad pulleys 29, 30. Collars or equivalent means are provided to position the pulleys and the shaft 28 turns in suitable bearings 32 on the frame 10. Either of the pulleys 29, 30 is adapted to be driven from the motor shaft (not shown), through the medium of a belt 33. Over one pulley 29 a straight belt 34 runs to a pulley 36 fast on a transverse shaft 38 and over the pulley 30 a cross belt 35 runs, said belt running also over a fixed pulley 37 on the shaft 38. Thus, through the medium of the belts 34, 35, the shaft 38 may be turned in reverse directions, shifting means being provided for the drive belt 33 as hereinafter explained. The numeral 41 indicates bracket bearings for the shaft 38, it being understood that any suitable arrangement of bearings is provided in practice.

On the shaft 38 are fixed sprocket wheels 39, 40 over which chain belts 42, 43 run, and said belts extend upwardly and run also about sprocket wheels 44 on an elevated shaft 45 which is mounted in bearings 46 on inclined pillars or frame members 47 suitably secured on the frame 10 as at 48. The shaft 45 is adapted to be turned back and forth, and it has fixed thereon ratchet wheels 51, 52, the teeth of which are oppositely disposed and said ratchet wheels are engaged respectively by pawls 49, 50 on the sprocket wheels 44. A drum 53 is fixed on the shaft 45 and winding thereon is a chain or rope 54, the ends of which therefore run over and under the said drum and are connected respectively with the levers 25, preferably by securing the chains to the weights 27 of said levers.

A belt shifter 56 is pivoted between its ends as at 57 to the end of a bracket arm 58 or other support on the tractor, one arm of the belt shifter having a shifting fork 59 straddling the belt 33 in the motor. Any suitable arrangement may be provided for actuating the belt shifter 56 alternately in opposite directions in unison with the movements of the ratchet levers 25 so that as one ratchet lever completes its working stroke to give a turning movement to the ratchet wheel 23, the belt 33 will be shifted from pulley 29 to pulley 30, or vice versa, to thereby, through the straight and cross belts 34 and 35, turn the shaft 38 alternately in opposite directions to turn the shaft 45 back and forth and thereby alternately reverse the movement of the drum 53 for alternately raising the levers 25. I illustrate one means for vibrating the belt shifter. In the illustrated example there is formed on that arm of the lever opposite the fork 59 a contact block 60, V-shaped, to present sloping sides that flare upwardly. The block 60 is disposed vertically and is positioned to cause the sides of the same to be alternately engaged by the weights 27 of the levers 25. In operation, therefore, with the belt 33 on the pulley 29, for example, the belt 34 will be driven and will turn the shaft 38 in one direction and through the chain belts 42, 43, the shaft 45 and drum 53 will be turned in one direction, whereby to wind in the end of the chain or cable 54 engaged with one lever 25 at the same time paying out that end of the chain or cable engaging the other lever 25. As the raised lever reaches the block 60 it will shift said block laterally, thereby throwing the shifting lever 56 to a position to shift the belt 33 to the pulley 39, and thereby, through the cross belt 35, turn the shaft 38 in the reverse direction and give a corresponding reverse movement to the shaft 45 and drum 54 so that the lever 25 which was previously raised will be permitted to descend and the opposite lever 25 will be raised. The operation of the levers 25 in an obvious manner actuates with the pawls 26, the ratchet wheels 23 thereby turning the shaft 22 and through the described connections, turning the shaft 18 and the rear axle 13.

Any approved steering means may be provided, there being indicated a steering rod 61, the steering wheel 62 of which is adjacent to the seat 63. The steering rod is shown as having a worm 64 engaging a worm wheel 65 and a shaft 66 on which are drums 67 from which chains 68 run to the front axle 11 as at 69.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

A drive means including a shaft, a pair of pulleys thereon, a driven belt shiftable to either of said pulleys, a belt shifter to shift said belt, a second shaft having separate fixed pulleys, a straight belt running over one of the pulleys on the first shaft and over one of the pulleys on the second shaft, a cross belt running over the other pulleys on the shafts, a drum shaft, driving connections between the drum shaft and the second shaft to turn the drum shaft alternately in opposite directions with the turning of the second shaft, a flexible element on said drum shaft, a fourth shaft, ratchet wheels on said fourth shaft, levers loose on the fourth shaft and connected respectively with the opposite end of the flexible element on the drum shaft, pawls on the said levers adapted to engage said ratchet wheels, and means to actuate the belt shifter by the movements of said levers.

LUTHER MARTIN YAGGY.

Copies of this patent may be obtained for five cents each, by addressing the "Commissioner of Patents, Washington, D. C."